United States Patent Office 3,798,227
Patented Mar. 19, 1974

3,798,227
PROCESS OF CYCLIZING ALKYLIDENE SUBSTITUTED AMINOMETHYLENEMALONATES
George Y. Lesher, Schodack, N.Y., assignor to Sterling Drug, Inc., New York, N.Y.
No Drawing. Application June 10, 1968, Ser. No. 735,566, now Patent No. 3,642,797, dated Feb. 15, 1972, which is a continuation-in-part of application Ser. No. 640,359, May 22, 1967, which in turn is a continuation-in-part of application Ser. No. 464,850, June 17, 1965, both now abandoned. Divided and this application Oct. 19, 1970, Ser. No. 82,170
Claims priority, application Great Britain, June 15, 1966, 26,787/66
Int. Cl. C07d 33/18
U.S. Cl. 260—289                          4 Claims

ABSTRACT OF THE DISCLOSURE

Alkylidene Ar-aminomethylenemalonates, where Ar is an aromatic radical having one or two aromatic rings which can be benzenoid or five- or six-membered heteroaromatic, are prepared by reacting the appropriate aromatic-amine with a mixture of a trialkyl orthoformate or trialkyl orthoacetate and an alkylidene malonate. The alkylidene Ar-aminomethylenemalonates are then cyclized by heating to provide an improved process for preparing various heterocyclic compounds, e.g., a 4-hydroxyquinoline from an alkylidene anilinomethylenemalonate, a 4H-pyrido[1,2-a]pyrimidin-4-one from an alkylidene 2-pyridylaminomethylenemalonate, a 4H - pyrimido[1,2-a] pyrimidine-4-one from an alkylidene 2-pyrimidylaminomethylenemalonate. The cyclized products are useful as intermediates for the preparation of antimalarials and anti-inflammatory agents.

---

This invention relates to aromatic amine derivatives, to a process for their preparation, to processes utilizing said derivatives as intermediates, and to certain products produced by said processes.

This application is a division of my copending application Ser. No. 735,566, filed June 10, 1968 and now U.S. Pat. 3,642,797, issued Feb. 15, 1972, which in turn is a continuation-in-part of application Ser. No. 640,359, filed May 22, 1967 and now abandoned, which in turn is a continuation-in-part of application Ser. No. 464,850, filed June 17, 1965 and now abandoned.

The invention sought to be patented, in one composition aspect, resides in the class of chemical compounds which I depict as having a molecular structure of the Formula I

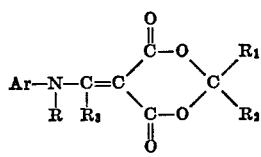

where Ar is 1–2 ringed aryl, R is hydrogen or loweralkyl, $R_1$ and $R_2$ are each lower-alkyl, and, $R_3$ is hydrogen or methyl.

The term "1–2 ringed aryl," as used throughout this specification, designated as Ar in Formula I, means aromatic radicals having one or two aromatic rings which can be benzenoid or five- or six-membered heteroaromatic, among which are, for purposes of illustration but without limiting the generality of the foregoing, phenyl, naphthyl, biphenylyl, pyridyl, pyrimidyl, pyrazinyl, pyridazinyl, thiazolyl, tetrazolyl, pyrazolyl, quinolyl and coumarinyl radicals. Preferred embodiments, because of their commercial practicability due to availability of intermediates and because of their use in a hereinbelow-described new process to prepare 4-hydroxyquinolines, are the compounds of Formula I where R is hydrogen and Ar is phenyl. Here and elsewhere throughout this specification, it will be understood that the benzene ring of phenyl can bear any kind and number of substituents such as would occur to the man skilled in organic chemistry, e.g., such substituents, solely for illustration and without limiting the generality of the foregoing, including lower-alkyl, lower-alkoxy, lower-alkylmercapto, lower-alkylsulfinyl, lower-alkylsulfonyl, halo, trihalomethyl, nitro, amino, lower-alkylamino, lower-alkanoylamino, benzyloxy, hydroxy, benzyl, and the like. When the benzene ring of phenyl is substituted, there are preferably from one to three substituents which can be in any of the available positions of the benzene ring, and where more than one substituent is present, they can be the same or different and they can be in any of the various position combinations relative to each other. The term "halo," as used here and throughout the specification, includes chloro, bromo, iodo and fluoro. The terms "lower-alkyl," "lower-alkoxy," "lower-alkylmercapto," "lower-alkylsulfinyl," "lower-alkylsulfonyl," "lower-alkylamino," "lower-alkanoylamino," and the like substituents, as used here and throughout the specification, have preferably from one to six carbon atoms which can be arranged as straight or branched chains, and, without limiting the generality of the foregoing, are illustrated by methyl, ethyl, n-propyl, isobutyl, n-hexyl, methoxy, isobutoxy, ethylmercapto, n-amylmercapto, ethylsulfinyl, isobutylsulfinyl, isopropylsulfonyl, n-butylsulfonyl, ethylamino, n-butylamino, acetylamino and propionylamino.

Other 1–2 ringed aryl radicals, e.g., naphthyl, biphenylyl, pyridyl, pyrimidyl, pyrazinyl, pyridazinyl, thiazolyl, tetrazolyl, pyrazolyl, coumarinyl and quinolyl radicals, also can bear at available ring-carbon positions substituents such as those illustrated above as substituents of the benzene ring.

The term "lower-alkyl" as used throughout this specification, e.g., as the meaning for each of $R_1$ and $R_2$ in Formula I, means alkyl radicals having from one to six carbon atoms inclusive, as illustrated by methyl, ethyl, n-propyl, isopropyl, 2-butyl, isobutyl, n-butyl, n-amyl, n-hexyl, and the like. Preferred embodiments, because of their cost advantage, are the compounds of Formula I where $R_1$ and $R_2$ are each methyl.

One process aspect of the invention resides in the preparation of the compounds of Formula I by reacting the appropriate aromatic-amine of the formula Ar-NHR with a mixture of a trialkyl orthoformate or trialkyl orthoacetate and an alkylidene malonate. This process is discussed hereinbelow and specifically illustrated as the first step of another process aspect of the invention, namely, the preparation of 4-hydroxyquinolines utilizing the compounds of Formula I where R is hydrogen and Ar is phenyl, as defined above.

4-hydroxyquinolines are valuable intermediates. For example, they have been converted to corresponding 4-haloquinolines which, in turn, have been reacted with certain alkylenediamines to synthesize compounds having valuable chemotherapeutic properties, e.g., reaction of 4,7-dichloroquinoline with 5-diethylamino-2-pentylamine yields 7-chloro-4-(5-diethylamino-2-pentylamino)-quinoline, an antimalarial agent known as chloroquine.

Heretofore, the preferred method of preparing 4-hydroxyquinolines has been the four-step Gould-Jacobs' synthesis illustrated as follows using aniline (II) as an intermediate:

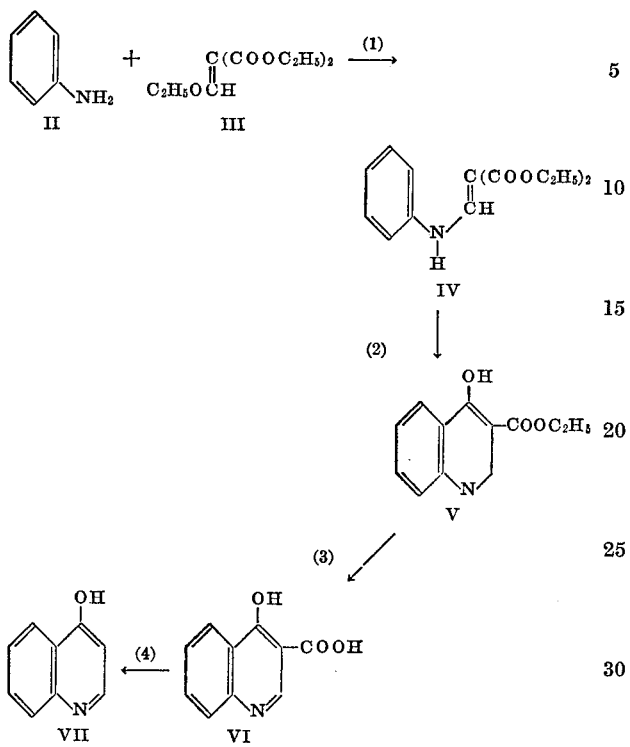

Thus, in step (1), aniline (II) is reacted with diethyl ethoxymethylenemalonate (III) to form diethyl anilinomethylenemalonate (IV), which is cyclized by heating in step (2) to form ethyl 4-hydroxyquinoline-3-carboxylate (V). In step (3), the ester (V) is hydrolyzed to the acid (VI) which is then decarboxylated in step (4) to produce 4-hydroxyquinoline (VII).

In contrast to the above four-step procedure, the process of my invention resides in only two steps, which are illustrated below using aniline (II) as an intermediate. As seen in the following illustration, no ester and no acid corresponding respectively to V and VI above are formed in my process.

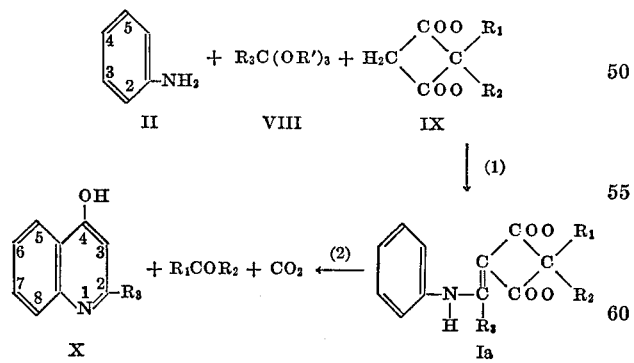

where $R_3$ is hydrogen or methyl, and $R'$, $R_1$ and $R_2$ are each lower-alkyl. The aniline used in my process is unsubstituted in at least one of benzene ring positions ortho to the amino group. Optionally, the aniline can be substituted by from one to four of a variety of substituents at positions 2, 3, 4 or 5 of the benzene ring thereby resulting in 4-hydroxyquinolines similarly substituted at positions 8, 7, 6 or 5, respectively; unsymmetrical anilines, e.g., those monosubstituted in the meta- or 3-position and having no substituents at either the 2- or 6-position, yield a mixture of isomeric 4-hydroxyquinolines (X), e.g., use of 3-chloroaniline results in a mixture of 5-chloro-4-hydroxyquinoline and 7-chloro-4-hydroxyquinoline which can be separated by known means.

In step (1) of my two-step process, an aniline (e.g., II) is reacted with a mixture of a trialkyl orthoformate (VIII, $R_3=H$) or orthoacetate (VIII, $R_3=CH_3$) and an alkylidene malonate (IX) to yield an alkylidene anilinomethylenemalonate (e.g., Ia) which, in step (2), is heated to form the 4-hydroxyquinoline (e.g., X) and a ketone, $R_1COR_2$, and carbon dioxide. Step (1) is preferably carried out by warming to about 50–100° C., with stirring, a mixture of the three reactants, preferred reactants being triethyl orthoformate (VIII, $R_3=H$ and $R'=C_2H_5$) and isopropylidene malonate (IX, $R_1=R_2=CH_3$). The reaction also can be run by stirring the reactants at room temperature although the reaction may take longer or, also, it can be run at temperatures higher than 100° C., although to no particular advantage. Many of the illustrative examples hereinbelow were carried out in the presence of a small quantity of p-toluenesulfonic acid since it was first thought that the reaction was acid catalyzed, but it was later found out that the condensation could be effected in the absence of an acid, in fact, even in the presence of excess sodium acetate. Actually, the reaction is preferably run with no condensing agent. Yields are very good, ranging from about 70 to 95%. Step (2) of my process, i.e., the ring closure of the alkylidene anilinomethylenemalonate (e.g., Ia) to form the 4-hydroxy-quinoline (e.g., X), was carried out by heating the isopropylidene anilinomethylenemalonate in an inert solvent at about 200 to 300° C., preferably at about 225–275° C. Found particularly useful was a refluxing eutectic mixture of diphenyl and diphenyl ether (Dowtherm® A). Other solvents that can be used are mineral oil, dibenzyl ether, diethyl phthalate, nitrobenzene, and the like. Optionally, the reaction can be run by heating as above in the absence of a solvent. Yields of this step usually range from about 50 to 100%.

Alternatively, the above two steps of my process have been run consecutively without isolation of Compound Ia, the yields being comparable with those obtained by isolating said intermediate.

Another variation of my process is the one-step reaction of the reactants of step (1) above using the reaction conditions of step (2) to form the 4-hydroxyquinolines. This variation, which also affords a way of preparing 4-hydroxyquinolines optionally bearing a 3-(lower-alkyl) substituent ($R_4$), is illustrated as follows using aniline (II):

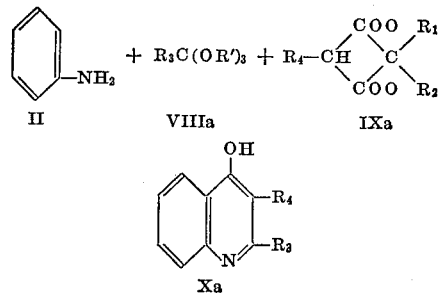

where $R_3$ is hydrogen or methyl, $R_4$ is hydrogen or lower-alkyl, and $R'$, $R_1$ and $R_2$ are each lower-alkyl. As above, the aniline used in the process is unsubstituted in at least one of the benzene ring positions ortho to the amino group and, optionally, can be substituted as noted hereinabove. In the above one-step synthesis, a mixture of an aniline (e.g., II) a trialkyl orthoformate (VIIIa, $R_3=H$) or orthoacetate (VIIIa, $R_3=CH_3$), and an alkylidene(lower-alkyl) malonate (IXa) is heated as in step (2) above to form the 4-hydroxyquinoline (e.g., Xa) and a ketone, $R_1COR_2$ and carbon dioxide.

In the above step (1) of my process, when another lower-aromatic amine ($Ar-NH_2$) is substituted for an aniline, the corresponding alkylidene (lower - aromatic) - aminomethylenemalonate of Formula I is obtained. When such a compound is treated as in step (2), ring closure is effected to produce a product containing a newly formed six-atom aromatic ring containing hydroxyl or oxo substituted in the position para to the ring-nitrogen atom. Thus, by heating a compound of Formula I where R is hydrogen, $R_1$ and $R_2$ are each lower-alkyl, $R_3$ is hydrogen or methyl, and Ar is 1–2 ringed aryl which has a substitutable ring-carbon atom ortho to its ring-carbon connected to the nitrogen atom of the aminomethylenemalonate moiety, there is formed a (4-hydroxy-2-$R_3$-5,6-pyrido)-Ar compound; or, by heating a compound of Formula I where R is hydrogen, $R_1$ and $R_2$ are each lower-alkyl, $R_3$ is hydrogen or methyl, and Ar is 1–2 ringed aryl which has a ring-nitrogen atom adjacent to its ring-carbon connected to the nitrogen atom of the aminomethylenemalonate moiety, ring closure is effected at the ring-nitrogen atom to form a (4-oxo-6-$R_3$-2,3-pyrimido)-Ar compound. These ring closures thus are other process aspects of my invention and, without limiting the generality of the foregoing, are illustrated as follows: heating an alkylidene naphthylaminomethylenemalonate to form a 4-hydroxybenzoquinoline; heating an alkylidene 2-pyridylaminomethylenemalonate to form a 4H-pyrido[1,2-a]pyrimidin-4-one; heating an alkylidene 2-substituted-3-pyridylaminomethylenemalonate to form a 4-hydroxy-8-substituted-1,7-naphthyridine; heating an alkylidene 2-unsubstituted-3-pyridylaminomethylenemalonate to form a 4-hydroxy-1,5-naphthyridine; heating an alkylidene 2-pyrimidylaminomethylenemalonate to form a 4H-pyrimido[1,2-a]pyrimidin-4-one; heating an alkylidene 5-uracilylaminomethylenemalonate to form a 1,5-dihydro-3H-pyrido[3,2-d]pyrimidine-2,4,8-trione; heating an alkylidene 2-pyrazinylaminomethylenemalonate to form a 4H - pyrazino-[1,2-a]pyrimidin-4-one; heating an alkylidene 3-pyridazinylaminomethylenemalonate to form a 4H-pyrimido[1,2-b]pyridazin-4-one; heating an alkylidene 2-thiazolylaminomethylenemalonate to form a pyrimido[2,1 - b]thiazole; heating an alkylidene 5-(1H-tetrazolyl)-aminomethylenemalonate to form a 7-hydroxytetrazolo[1,5-a]pyrimidine; heating an alkylidene 2-phenyl (or lower-alkyl)-3-pyrazolylaminomethylenemalonate to form a 1-phenyl(or lower-alkyl)-1H-pyrazolo[3,4-b]pyridine; heating an alkylidene 2-quinolylaminomethylenemalonate to form a 1H-pyrimido[1,2-a]quinolin-1-one; heating an alkylidene 3-quinolylaminomethylenemalonate to form a benzo[f]]1,7] naphthyridin-1-ol; heating an alkylidene 5-quinolylaminomethylenemalonate to form a 1,7-phenanthrolin - 4 - ol; heating an alkylidene 6-quinolylaminomethylenemalonate to form a 4,7-phenanthrolin-1-ol; heating an alkylidene 7-quinolylaminomethylenemalonate to form a 1,7-phenanthrolin-10-ol; heating an alkylidene 8 - quinolylaminomethylenemalonate to form a 1,10 - phenanthrolin-4-ol; and, heating an alkylidene 6-coumarinylaminomethylenemalonate to form a 10-hydroxy-3-oxo-3H-pyrano[3,2-f] quinoline.

The (4-hydroxy-2-$R_3$-5,6-pyrido)-Ar and (4-oxo-6-$R_3$-2,3-pyrimido)-Ar products of my process are useful, for example, the former are useful as intermediates in the preparation of antimalarial agents, as illustrated above for the 4-hydroxyquinolines, and the latter have anti-inflammatory activity, as illustrated below for the 4H-pyrido[1,2-a]pyrimidin-4-ones.

It will be noticed that Ar in Formula I includes substituents which by their location may inhibit or even prevent the cyclization process to form the (4-hydroxy-2-$R_3$-5,6-pyrido)-Ar or (4-oxo-6-$R_3$-2,3-pyrimido)-Ar compound, e.g., the failure to cyclize isopropylidene 2,6-dimethylanilinomethylenemalonate (by the blocking action of the 2- and 6-methyl substituents). Nevertheless, such compounds as these are useful in establishing the limits of the cyclization reaction.

Also, it will be noticed that the compounds of Formula I where R is lower-alkyl do not undergo cyclization, e.g., the failure to cyclize isopropylidene N-methylanilino-methylenemalonate (by the apparent blocking action of the N-methyl substituent). Such compounds are, nevertheless, useful in establishing the limits of the cyclization reaction. Further, these N-(lower-alkyl) compounds have been tested by standard pharmacological evaluation procedures and found to be useful in having biological activity, e.g., psychomotor depressant properties, barbiturate-potentiating activity, as illustrated further hereinbelow.

Another composition aspect of my invention sought to be patented is described as residing in the class of chemical compounds which I designated 4H-pyridol[1,2-a] pyrimidin-4-ones of the Formula XI

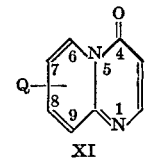

XI where Q represents from one to three substituents at positions 6, 7, 8 or 9 of the pyridopyrimidine nucleus selected from the group consisting of lower-alkyl, hydroxy, lower-alkanoylamino, lower-alkylamino, benzyl, lower-alkoxy, lower-alkylmercapto, lower-alkylsulfinyl, lower-akylsulfonyl and trihalomethyl. These embodiments of my invention are useful because of their anti-inflammatory properties as established by known pharmacological test procedures, e.g., inhibition of carrageenin induced local foot edema in fasted rats. For example, when tested by the above-noted procedure, these compounds when administered orally at dose levels in the range of 25 to 200 mg./kg. were found to afford greater than 30% inhibition of edema, thereby evidencing their anti-inflammatory activity. In contrast, the corresponding unsubstituted compound, i.e., Formula XI where Q is hydrogen, when tested by the same procedure, produced insignificant inhibition at 200 mg./kg.

The compounds of Formula XI were prepared by my above-described process, that is, by heating a Q-2-pyridyl-aminomethylenemalonate (Ib) to form a Q-4H-pyrido-[1,2-a]pyrimidin-4-one (XI), illustrated structurally as follows:

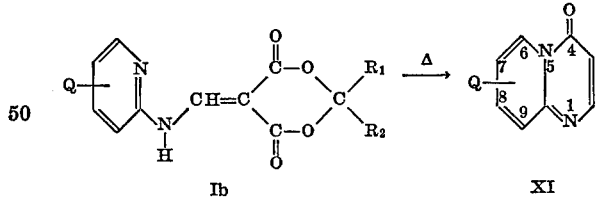

Ib                XI

The compounds of Formula XI are useful both in free base form and in acid-addition salt form and both forms are within the purview of the invention, and are considered to be one and the same invention. The acid-addition salts are simply a usually more convenient form for use; and, in practice, use of the salt form inherently amounts to use of the base form. The acids which can be used to prepare the acid-addition salts are preferably those which produce, when combined with the free base, pharmacodynamically acceptable salts, that is, salts whose anions are relatively innocuous to the animal organism in pharmacodynamic doses of the salts, so that the beneficial properties inherent in the free base are not vitiated by side effects ascribable to the anions; in other words, the latter do not substantially affect the pharmacodynamic properties inherent in the cations. Appropriate pharmacodynamically acceptable salts within the scope of the invention are those derived from mineral acids such as hydrochloric acid, hydrobromic acid, hydriodic acid, nitric acid, phosphoric acid, sulfamic acid, and sulfuric acid; and, organic acids such as acetic acid, citric acid, tartaric acid, lactic acid, methanesulfonic acid, ethanesulfonic acid, quinic acid, and the like, giving the hydrochloride, hydrobromide, hydriodide, nitrate, phosphate, sulfamate, sulfate, acetate, citrate, tartrate, lactate, methanesulfonate, ethanesulfonate and quinate, respectively.

The acid-addition salts are prepared preferably by reacting the free base and acid in an organic solvent, e.g., ethanol, in which case the salt separates directly or can be obtained by concentration of the solution.

Although pharmacodynamically acceptable salts are preferred, all acid-addition salts are within the scope of my invention. All acid-addition salts are useful as sources of the free base form even if the particular salt per se is not desired as the final product, as for example when the salt is formed for purposes of purification or identification, or when it is used as an intermediate in preparing a pharmacodynamically acceptable salt by ion exchange procedures.

Also encompassed by my invention are quaternary ammonium salts of the aforesaid 4H-pyrido[1,2-a]pyrimidin-4-ones of the Formula XI, quaternization occurring at the 1-ring nitrogen. These salts are also useful because of their anti-inflammatory properties and are useful for further identification of said 4H-pyrido[1,2-a]pyrimidin-4-ones. The quaternary ammonium salts are obtained by the addition of esters having a molecular weight less than about 200 to the free base form of the compounds. A preferred class of esters comprises lower-alkyl, lower-alkenyl or benzyl esters of inorganic acids or organic sulfonic acids of the formula $R_5$-An where $R_5$ is lower-alkyl, lower-alkenyl (having 3 to 6 carbon atoms) or benzyl and An is an anion of a strong inorganic acid or an organic sulfonic acid, e.g., chloride, bromide, iodide, sulfate, methanesulfonate, benzenesulfonate, para-toluenesulfonate, and the like. $R_5$ when benzyl can bear any number and kind of inert substituents in the benzene ring, such substituents being illustrated by, but not limited to, lower-alkyl, lower-alkoxy, halo, nitro, lower-alkylamino, lower-alkylmercapto, and the like. $R_5$-An is thus illustrated by, but not limited to, methyl chloride, methyl bromide, methyl iodide, ethyl bromide, propyl chloride, isobutyl bromide, allyl chloride, allyl bromide, methyl sulfate, methyl methanesulfonate, methyl benzenesulfonate, methyl p-toluenesulfonate, benzyl chloride, benzyl bromide, p-chlorobenzyl chloride, p-nitrobenzyl chloride, o-chlorobenzyl chloride, 3,4-dichlorobenzyl chloride, p-methoxybenzyl chloride, and the like. The quaternary ammonium salts are prepared by mixing the free base and the alkyl, alkenyl or benzyl esters in an organic solvent inert under the conditions of reaction, for example, ethanol, methanol, ether, acetonitrile, dimethylformamide, dimethyl sulfoxide, and the like or, alternatively, in the absence of a solvent. Heating is preferably used to facilitate the reaction, although quaternary formation takes place at room temperature but a longer reaction time is needed. The quaternary ammonium salt separates directly or can be obtained by concentration of the solution.

Also encompassed by my invention are the 1-oxide derivatives of the alkylidene pyridylaminomethylenemalonates of Formula Ib. These compounds, which are prepared by the first step of my above-described process by reacting a 2-aminopyridine-N-oxide with a tri-(lower-alkyl) orthoformate and an alkylidene malonate, are useful as characterizing derivatives of the compounds of Formula Ib.

Other aspects encompassed by my invention are: the bis-analogs of the compounds of Formula I, i.e., the compounds of the Formula XII

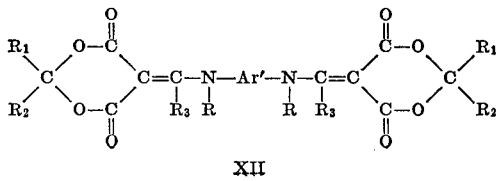

XII where Ar' is phenylene or as defined hereinbelow (i.e., Ar"—Z—Ar") and, R, $R_1$, $R_2$ and $R_3$ are each defined as above for Formula I; the process of preparing the bis compounds of Formula XII which is carried out the same as the hereinabove-described process of preparing the compounds of Formula I but using an arylenediamine of the formula $H_2N$—Ar'—$NH_2$ and at least two molar equivalents of the other reactants, i.e., a mixture of a trialkyl orthoformate or trialklyl orthoacetate and an alkylidene malonate; and, the process of heating a compound of Formula XII as described hereinabove (for the process of heating a compound of Formula I) to form the corresponding bis(4-hydroxy-2-$R_3$-5,6-pyrido)=Ar' compound when Ar' is phenylene which is unsubstituted at ring-carbon positions ortho to its ring-carbons connected to the nitrogen atoms of the aminomethylenemalonate moieties. Other bis-aspects of my invention are like the above where —Ar'— is replaced by —Ar"—Z—Ar"— where Ar" is phenylene and Z is a direct linkage, O, S, S—S, NH N(lower-alkyl), C(=O) or lower-alkylene. Here and elsewhere throughout this specification, it will be understood that the benzene ring of phenylene, designated above as Ar' and Ar", can bear any kind and number of substituents such as would occur to the man skilled in organic chemistry, e.g., such substituents being the same as those illustrated above for the benzene ring of phenyl.

The molecular structures of the compounds of my invention are established by their mode of synthesis and corroborated by the correspondence of calculated and found values for the elementary analyses and by infrared (IR) spectral analyses.

The following examples will further illustrate the invention without, however, limiting it thereto.

EXAMPLE 1

(A) Isopropylidene 4 - methoxyanilinomethylenemalonate.—A mixture containing 12.3 g. of 4-methoxyaniline, 14.8 g. of ethyl orthoformate, 15.8 g. of isopropylidene malonate and 1.0 g. of p-toluenesulfonic acid monohydrate was stirred at room temperature for one hour and then heated for ten minutes on a steam bath to boil off the ethanol formed by the reaction. The solid that remained was recrystallized from 500 cc. of 95% ethanol using decolorizing charcoal to yield 15 g. (54%) of the product, isopropylidene 4-methoxyanilinomethylenemalonate, M.P. 163–164.5° C. A 5.0 g. sample was recrystallized again from ethanol and dried in a vacuum oven at 60° C. to yield 4.2 g. of the white microcrystalline product, M.P. 163.2–166.8° C. (corr.).

Analysis.—Calcd. for $C_{14}H_{15}NO_5$ (percent): C, 60.64; H, 5.45; N, 5.05. Found (percent): C, 60.84; H, 5.46; N, 4.97.

(B) 4-hydroxy-6-methoxyquinoline was prepared from isopropylidene 4 - methoxyanilinomethylenemalonate as follows: To 100 ml. of Dowtherm A heated to 245° C. was added, with stirring, 10.0 g. of isopropylidene 4-methoxyanilinomethylenemalonate whereupon a vigorous reaction occurred and the acetone formed by the reaction was boiled from the reaction mixture. Heating was continued for an additional five minutes after which time no more acetone boiled off. The reaction mixture was allowed to cool to room temperature with continued stirring and the solid that separated was collected, washed with n-pentane, air-dried and recrystallized from water to yield 2.9 g. of 4-hydroxy-6-methoxy-quinoline, M.P. 245–247° C.

Analysis.—Calcd. for $C_{10}H_9NO_2$ (percent): C, 68.56; H, 5.18; N, 8.00. Found (percent): C, 68.86; H, 4.99; N, 8.01, 7.65.

The same product, 4-hydroxy-6-methoxyquinoline, is obtained by heating isopropylidene 4-methoxyanilinomethylenemalonate at 245° C. in the absence of a solvent.

EXAMPLE 2

(A) Isopropylidene 4-methylanilinomethylenemalonate was prepared following the procedure described in Example 1(A) using 10.7 g. of p-toluidine, 14.8 g. of ethyl orthoformate, 15.8 g. of isopropylidene malonate and 1.0 g. of p-toluenesulfonic acid monohydrate. There was thus obtained 17.5 g. (67%) of the product, isopropylidene 4-methylanilinomethylenemalonate, M.P. 151–152.5° C. Recrystallization of a 5.0 g. sample from ethanol a second time yielded 4.7 g. of the product, M.P. 150.0–151.2° C. (corr.).

*Analysis.*—Calcd. for $C_{14}H_{15}NO_4$ (percent): C, 64.36; H, 5.79; N, 5.36. Found (percent): C, 64.28; H, 6.06; N, 5.32.

(B) Following the procedure described in Example 1(B), isopropylidene 4-methylanilinomethylenemalonate (12.5 g.) was heated in Dowtherm A (125 ml.) to yield 4.1 g. of 4-hydroxy-6-methylquinoline. A sample recrystallized from water and dried in a vacuum oven at 60° C. melted at 237–239° C.

*Analysis.*—Calcd. for $C_{10}H_9NO$ (percent): C, 75.45; H, 5.70; N, 8.80. Found (percent): C, 75.71; H, 5.59; N, 8.60, 8.70.

EXAMPLE 3

(A) Isopropylidene anilinomethylenemalonate was prepared following the procedure described in Example 1(A) using 9.3 g. of aniline, 14.8 g. of ethyl orthoformate, 15.8 g. of isopropylidene malonate and 1.0 g. of p-toluenesulfonic acid monohydrate. There was thus obtained 19.5 g. (79%) of the product, isopropylidene anilinomethylenemalonate, M.P. 154.0–155.8° C. (corr.).

*Analysis.*—Calcd. for $C_{13}H_{13}NO_4$ (percent): C, 63.15; H, 5.30; N, 5.67. Found (percent): C, 63.44; H, 5.16; N, 5.35.

(B) Ring closure of isopropylidene anilinomethylenemalonate (2.5 g.) in Dowtherm A (25 ml.) as in Example 1(B) yielded 1.0 g. (69%) of 4-hydroxyquinoline, M.P. 192–198° C.

EXAMPLE 4

(A) Isopropylidene 4-nitroanilinomethylenemalonate was prepared following the procedure described in Example 1(A) using 13.8 g. of p-nitroaniline, 14.8 g. of ethyl orthoformate, 15.8 g. of isopropylidene malonate and 1.0 g. of p-toluenesulfonic acid monohydrate. There was thus obtained 19.5 g. (67%) of isopropylidene 4-nitroanilinomethylenemalonate after one recrystallization from acetonitrile. A 4.0 g. sample was recrystallized a second time from acetonitrile to yield 3.7 g. of the product, M.P. 215.0–2.16.0° C. (corr.) with decomposition.

*Analysis.*—Calcd. for $C_{13}H_{12}N_2O_6$ (percent): C, 53.43; H, 4.14; N, 9.59. Found (percent): C, 53.62; H, 4.07; N, 9.63.

(B) Refluxing 2.9 g. of isopropylidene 4-nitroanilinomethylenemalonate in 58 ml. of Dowtherm A as in Example 1(B) yielded 1.7 g. (90%) of 4-hydroxy-6-nitroquinoline, M.P. 338–339° C., with decomposition.

(C) 4-hydroxy-6-nitroquinoline was also obtained by heating a small sample of isopropylidene 4-nitroanilinomethylenemalonate in refluxing nitrobenzene for about four minutes, allowing the reaction mixture to cool to room temperature, and collecting the product by filtration.

EXAMPLE 5

(A) Isopropylidene 4-chloroanilinomethylenemalonate was prepared following the procedure described in Example 1(A) using 12.8 g. of p-chloroaniline, 14.8 g. of ethyl orthoformate, 15.8 g. of isopropylidene malonate and 1.0 g. of p-toluenesulfonic acid monohydrate. After one recrystallization from ethanol, there was obtained 23.5 g. (84%) of isopropylidene 4-chloroanilinomethylenemalonate, M.P. 209.0–209.4° C. (corr.), with decomposition.

*Analysis.* — Calcd. for $C_{13}H_{12}ClNO_4$ (percent): C, 55.43; H, 4.29; N, 4.98. Found (percent): C, 55.18; H, 4.07; N, 4.84.

(B) 6-chloro-4-hydroxyquinoline (0.8 g., 44%) was obtained following the procedure described in Example 1(B) using 2.8 g. of isopropylidene 4-chloroanilinomethylenemalonate and 30 ml. of Dowtherm A.

(C) 6-chloro-4-hydroxyquinoline was prepared in one step using the reactants of 5(A) as follows: A mixture containing 2.5 g. of p-chloroaniline, 3.0 g. of ethyl orthoformate, 3.2 g. of isopropylidene malonate and 56 ml. of Dowtherm A was slowly heated to 100° C. with stirring over a period of thirty minutes. Heating of the resulting clear solution was then accelerated. At 120° C., bubbles began to form. After ten minutes the temperature was 251° C. Evolution of bubbles had been very rapid above 200° C. but by 230° C., bubbling had subsided somewhat and the solution began to turn red. The reaction mixture was allowed to cool to room temperature while being stirred. The precipitate was collected, washed well with n-pentane and air-dried to yield 1.5 g. (42%) of 6-chloro-4-hydroxyquinoline, M.P. 251–261° C.

EXAMPLE 6

(A) Isopropylidene 2-methylanilinomethylenemalonate was prepared following the procedure described in Example 1(A) using 10.7 g. of o-toluidine, 14.8 g. of ethyl orthoformate, 15.8 g. of isopropylidene malonate and 1.0 g. of p-toluenesulfonic acid monohydrate. There was thus obtained 19.9 g. (76%) of isopropylidene 2-methylanilinomethylenemalonate. A second recrystallization of a 5.0 g. sample from ethanol yielded 4.2 g. of the product, M.P. 120.2–121.8° C. (corr.).

*Analysis.*—Calcd. for $C_{14}H_{15}NO_4$ (percent): C, 64.36; H, 5.79; N, 5.36. Found (percent): C, 64.26; H, 5.65; N, 5.52.

(B) Refluxing 7.5 g. of isopropylidene 2-methylanilinomethylenemalonate in 75 ml. of Dowtherm A as in Example 1(B) yielded 3.3 g. (72%) of 4-hydroxy-8-methylquinoline, M.P. 211–215° C.

(C) Refluxing 7.5 g. of isopropylidene 2-methylanilinomethylenemalonate in 37.5 ml. of nitrobenzene as in Example 4(C) yielded 2.5 g. (54%) of 4-hydroxy-8-methylquinoline, M.P. 213.5–215° C. Recrystallization of this product from water using decolorizing charcoal yielded 1.9 g. of the 4-hydroxy-8-methylquinoline, M.P. 215–216° C.

*Analysis.*—Calcd. for $C_{10}H_9NO$ (percent): C, 75.45; H, 5.70; N, 8.80. Found (percent): C, 75.53; H, 5.41; N, 8.79.

EXAMPLE 7

(A) Isopropylidene 2-methoxyanilinomethylenemalonate.—A mixture containing 12.3 g. of o-anisidine, 14.8 g. of ethyl orthoformate, 15.8 g. of isopropylidene malonate and 1.0 g. of p-toluenesulfonic acid monohydrate was stirred at room temperature. The reaction mixture warmed spontaneously and after ten minutes crystallized. The crystallized material was collected, recrystallized from ethanol and air-dried to yield 23.1 g. (83%) of isopropylidene 2-methoxyanilinomethylenemalonate, M.P. 153–155° C. Recrystallization of a 5.0 g. sample from ethanol yielded 4.8 g. of the product, M.P. 154.0–155.8° C. (corr.).

*Analysis.*—Calcd. for $C_{14}H_{15}NO_5$ (percent): C, 60.64; H, 5.45; N, 5.05. Found (percent): C, 60.94; H, 5.33; N, 5.33.

(B) Refluxing 5.5 g. of the above product, isopropylidene 2-methoxyanilinomethylenemalonate, in 55 ml. of Dowtherm A following the procedure described in Example 1(B) yielded 0.6 g. of 4-hydroxy-8-methoxyquinoline, M.P. 185–186° C.

*Analysis.*—Calcd. for $C_{10}H_9NO_2$ (percent): C, 68.56; H, 5.18; N, 8.00. Found (percent): C, 68.58; H, 5.06; N, 7.96.

EXAMPLE 8

(A) Isopropylidene 2-nitroanilinomethylenemalonate was prepared following the procedure described in Exampe 1(A) using 13.8 g. of o-nitroaniline, 14.8 g. of ethyl orthoformate, 15.8 g. of isopropylidene malonate and 1.0 g. of p-toluenesulfonic acid monohydrate. There was thus obtained, after recrystallization from acetonitrile, 14.1 g. (48%) of isopropylidene 2-nitroanilinomethylenemalonate, M.P. 175–177° C. A small sample for analysis was recrystallized a second time from acetonitrile, M.P. 180–181° C. with decomposition.

*Analysis.*—Calcd. for $C_{13}H_{12}N_2O_6$ (percent): C, 53.43; H, 4.14; N, 9.59. Found (percent): C, 53.29; H, 4.80; N, 9.44.

(B) Isopropylidene 2-nitroanilinomethylenemalonate (5.0 g.) was converted to 4-hydroxy-8-nitroquinoline (0.9 g.), M.P. 207–209° C. by refluxing in nitrobenzene (50 ml.) following the procedure described in Example 4(C) and recrystallizing from water using decolorizing charcoal.

*Analysis.*—Calcd. for $C_9H_6N_2O_3$ (percent): C, 56.84; H, 3.18; N, 14.73. Found (percent): C, 57.10; H, 3.05; N, 14.23.

(C) 4-hydroxy-8-nitroquinoline (3.7 g.) was obtained by refluxing isopropylidene 2-nitroanilino-methylenemalonate (7.0 g.) in Dowtherm A (140 ml.) following the procedure described in Example 1(B).

EXAMPLE 9

(A) Isopropylidene 4-methoxy-2-nitroanilinomethylenemalonate.—A mixture containing 33.6 g. of 4-methoxy-2-nitroaniline, 29.6 g. of triethyl orthoformate, 31.7 g. of isopropylidene malonate and 150 ml. of absolute ethanol was heated with stirring on a steam bath for ten minutes. The reaction mixture was then heated in vacuo for an additional fifteen minutes to remove the solvent and the ethanol formed by the reaction. The remaining solid was recrystallized from acetonitrile, using decolorizing charcoal, to yield 47.3 g. (73.5%) of isopropylidene 4-methoxy-2-nitroanilinomethylenemalonate, M.P. 203.0–203.6° C. (corr.), with decomposition.

*Analysis.*—Calcd. for $C_{14}H_{14}N_2O_7$ (percent): C, 52.17; H, 4.38; N, 8.69. Found (percent): C, 52.28; H, 4.55; N, 8.75.

(B) Following the procedure described in Example 1(B) and using 10 g. of isopropylidene 4-methoxy-2-nitroanilinomethylenemalonate and 150 ml. of Dowtherm A, there was obtained 4.9 g. (72%) of 4-hydroxy-6-methoxy-8-nitroquinoline, M.P. 229–230° C. Recrystallization of this compound from ethanol, using decolorizing charcoal, yielded 3.7 g. of the product melting at 228.0–228.6° C. (corr.).

*Analysis.*—Calcd. for $C_{10}H_8N_2O_4$ (percent): C, 54.55; H, 3.66; N, 12.72. Found (percent): C, 54.75; H, 3.81; N, 12.48.

EXAMPLE 10

(A) Isopropylidene 3-nitroanilinomethylenemalonate was prepared following the procedure described in Example 1(A) using 13.8 g. of 3-nitroaniline, 14.8 g. of ethyl orthoformate, 15.8 g. of isopropylidene malonate, and 1.0 g. of p-toluenesulfonic acid monohydrate. There was thus obtained 22.8 g. (78%) of the product, M.P. 198–201° C. with decomposition after recrystallization from about 1 liter of acetonitrile. Recrystallization of a 5.0 g. sample from acetonitrile gave 4.2 g. of the product, M.P. 197.0–203.8° C. (corr.) with decomposition.

*Analysis.*—Calcd. for $C_{13}H_{12}N_2O_6$ (percent): C, 53.43; H, 4.14; N, 9.59. Found (percent): C, 53.34; H, 4.40; N, 9.75.

(B) To 50 ml. of dibenzyl ether heated to 250° C. was added with rapid stirring 5.0 g. of isopropylidene 3-nitroanilinomethylenemalonate. After evolution of carbon dioxide subsided (about thirty seconds), the mixture was allowed to cool to room temperature with rapid stirring. The resulting precipitate was collected, washed well with dry ether and dried to yield 1.4 g. (43%) of product, M.P. 297–299° C. with decomposition. This product, a mixture of 4-hydroxy-5-nitroquinoline and 4-hydroxy-7-nitroquinoline, was subjected to a thin layer chromatography (TLC) analysis as follows: A sample was placed on a silica gel plate with dimethylformamide and eluted with 80% chloroform:10% acetic acid:10% methanol. After spraying the plate with fluorscein dye, two fluorescent spots appeared in addition to the dimethylformamide spot. Amounts roughly estimated by size and density of the spots were 3:1 with the larger spot running ahead (the large spot presumably represents the 7-nitro isomer). The product was then recrystallized from dimethylformamide using decolorizing charcoal to yield 0.3 g. of 4-hydroxy-7-nitroquinoline, M.P. >360° C. with decomposition.

*Analysis.*—Calcd. for $C_9H_6N_2O_3$ (percent): C, 56.84; H, 3.18; N, 14.74. Found (percent): C, 56.77; H, 3.47; N, 14.47.

The above dimethylformamide filtrate was diluted with several volumes of dry ether and the solid that separated was collected, washed with ether and dried to yield 0.4 g. of 4-hydroxy - 5 - nitroquinoline, M.P. 350° C. with decomposition. A mixed melting point with the 7-nitro isomer was depressed 50°.

*Analysis.*—Calcd. for $C_9H_6N_2O_3$ (percent): C, 56.84; H, 3.18; N, 14.74. Found (percent): C, 56.61; H, 3.26; N, 14.58.

EXAMPLE 11

(A) Isopropylidene 3 - chloroanilinomethylenemalonate.—A mixture containing 12.8 g. of 3-chloroaniline, 15.8 g. of isopropylidene malonate, 14.8 g. of ethyl orthoformate and 1.0 g. of p-toluenesulfonic acid monohydrate was heated slowly. After one hour, the temperature had risen to 80° C. and about 11.4 g. of ethanol had distilled off. The reaction mixture was then heated for an additional thirty minutes whereupon the temperature rose to about 120° C. The resulting crystalline product was recrystallized from about 1000 ml. of absolute ethanol to yield 22.4 g. (80%) of isopropylidene 3-chloroanilinomethylenemalonate, M.P. 167.6–169.0° C.

*Analysis.*—Calcd. for $C_{13}H_{12}ClNO_4$ (percent): N, 4.98; Cl, 12.59. Found (percent): N, 4.81; Cl, 12.45.

(B) Conversion of isopropylidene 3-chloroanilinomethylenemalonate into a mixture of 5-chloro - 4 - hydroxyquinoline and 7-chloro - 4 - hydroxyquinoline and subsequent conversion of these isomers to the corresponding 4,5(and 7) - dichloroquinolines are given as follows: To 30 ml. of refluxing Dowtherm A was added with stirring 2.8 g. of isopropylidene 3 - chloroanilinomethylenemalonate. After an initial vigorous reaction, the mixture was refluxed for ten minutes and cooled to room temperature while stirring. The solid that separated was collected to yield 1.6 g. (89%) of a mixture of 5 - chloro - 4 - hydroxyquinoline and 7-chloro-4-hydroxyquinoline.

A mixture of 1.0 g. of the above mixture of isomers, 1 ml. of phosphorus oxychloride and 5 ml. of ethylene dichloride was warmed on a steam bath for about five minutes and then poured into ice water which contained ammonium hydroxide. The mixture was stirred until the ice melted and an insoluble solid was filtered off. The layers were separated and the ethylene dichloride layer was dried over anhydrous potassium carbonate and evaporated to dryness. The solid residue was taken up in n-hexane and filtered. After no solid separated from the hexane solution, the hexane was allowed to evaporate over a period of four days. There was thus obtained 0.5 g. (45%) of a mixture of approximately equal parts of 4,5 - dichloroquinoline and 4,7 - dichloroquinoline, M.P. 67–69° C., as shown by TLC using ether as the developing solvent and authentic samples of each compound as standards.

EXAMPLE 12

6-chloro - 4 - hydroxy - 3 - methylquinoline was prepared as follows: A mixture containing 2.0 g. of 4-chloroaniline, 2.7 g. of triethyl orthoformate, 2.5 g. of isopropylidene methylmalonate, and 30 ml. of Dowtherm A was heated slowly with stirring up to reflux, refluxed for three minutes and then allowed to cool. The product that separated was collected and recrystallized from isopropyl alcohol to yield 6-chloro-4-hydroxy-3-methylquinoline, M.P. 329–331° C.

*Analysis.*—Calcd. for $C_{11}H_8ClNO$ (percent): Cl, 17.24; N, 6.81. Found (percent): Cl, 17.76; N, 7.03.

EXAMPLE 13

(A) Isopropylidene 3 - methylanilinomethylenemalonate was prepared following the procedure described in Example 1(A) using 10.7 g. of m-toluidine, 14.8 g. of ethyl orthoformate, 15.8 g. of isopropylidene malonate and 1.0 g. of p-toluenesulfonic acid monohydrate. There was then obtained 19.6 g. (75%) of isopropylidene 3-methylanilinomethylenemalonate, M.P. 119.5–121.0° C. Recrystallization of a 5.0 g. sample from ethanol yielded 4.7 g. of the product, M.P. 115.0–116.6° C. (corr.).

*Analysis.*—Calcd. for $C_{14}H_{15}NO_4$ (percent): C, 64.36; H, 5.79; N, 5.36. Found (percent): C, 64.52; H, 5.80; N, 5.25.

(B) Heating a sample of isopropylidene 3 - methylanilinomethylenemalonate in refluxing Dowtherm A following the procedure described in Example 11(B) yields a mixture of 4 - hydroxy - 5 - methylquinoline and 4-hydroxy-7-methylquinoline.

EXAMPLE 14

(A) 4 - heptylidene 4 - nitroanilinomethylenemalonate [also named 5 - (4 - nitroanilinomethylene) - 4,6 - dioxo-2,2 - di - n - propyl - 1,3 - dioxan].—A mixture containing 2.8 g. of 4-nitroaniline, 3.2 g. of triethyl orthoformate and 4.0 g. of 4-heptylidene malonate was stirred on a steam bath. When a precipitate formed before all of the aniline had gone into solution, 20 ml. of ethanol was added and stirring was continued on the steam bath for ten minutes. The reaction mixture was allowed to cool and the precipitate was collected, recrystallized once from acetonitrile and once from isopropyl alcohol to yield 5.5 g. of 4 - heptylidene 4 - nitroanilinomethylenemalonate, M.P. 171.6–172.6° C. (corr.).

*Analysis.*—Calcd. for $C_{17}H_{20}N_2O_6$ (percent): C, 58.61; H, 5.79; N, 8.04. Found (percent): C, 58.56; H, 5.57; N, 8.03.

(B) 4-hydroxy - 6 - nitroquinoline was prepared from the product of Example 14(A) as follows: To 60 ml. of Dowtherm A heated to 240° C. was added with stirring 3.0 g. of 4-heptylidene 4-nitroanilinomethylenemalonate. The reaction mixture was heated to 240° C. and held there for about two minutes and was then allowed to cool to room temperature with stirring. The precipitate was collected, washed with n-pentane to yield 1.4 g. (85%) of 4-hydroxy-6-nitroquinoline, M.P. 334–335° C. with decomposition.

EXAMPLE 15

(A) 4-heptylidene 3-nitroanilinomethylenemalonate.—To a stirred solution containing 5.6 g. of 3-nitroaniline and 8.0 g. of 4-heptylidene malonate dissolved in 50 ml. of warm ethanol was added 6.4 g. of triethyl orthoformate, and the resulting mixture was stirred at room temperature for about thirty minutes and then cooled. The precipitate was collected, recrystallized from isopropyl alcohol and washed with n-pentane to yield 12.2 g. (87%) of 4-heptylidene 3 - nitroanilinomethylenemalonate, M.P. 138.0–139.0° C.

*Analysis.*—Calcd. for $C_{17}H_{20}N_2O_6$ (percent): C, 58.61; H, 5.79; N, 8.04. Found (percent): C, 58.51; H, 5.60; N, 7.96.

(B) A mixture of 4-hydroxy-5-nitroquinoline and 4-hydroxy-7-nitroquinoline was prepared from the above product of Example 15(A) as follows: To 60 ml. of Dowtherm A heated to 240° C. was added with stirring 3.0 g. of 4-heptylidene 3-nitroanilinomethylenemalonate, the reaction mixture heated to 245° C. and then allowed to cool to room temperature with stirring. The precipitate was collected, washed with n-pentane and air-dried to yield 1.5 g. (91%) of a mixture containing 4-hydroxy-5-nitroquinoline and 4-hydroxy-7-nitroquinoline in the ratio of about one to two, as determined by the TLC procedure described above in Example 10(B).

EXAMPLE 16

(A) 4 - heptylidene 3 - chloroanilinomethylenemalonate.—To a mixture containing 10.0 g. of 4-heptylidene malonate and 8.0 g. of triethyl orthoformate was added 6.4 g. of 3-chloroaniline; 25 ml. of ethanol was added to the resulting mixture. The mixture was heated on a steam bath until dissolution resulted, then allowed to cool and stand at room temperature for two hours. The resulting mixture was cooled in ice and the product that separated was collected, recrystallized from isopropyl alcohol and washed with n-pentane to yield 14 g. (83%) of 4-heptylidene 3 - chloroanilinomethylenemalonate, M.P. 121.5–123.0° C. (corr.).

*Analysis.*—Calcd. for $C_{17}H_{20}ClNO_4$ (percent): C, 60.44; H, 5.97; Cl, 10.5. Found (percent): C, 60.49; H, 6.24; Cl, 10.7.

(B) Heating a sample of 4-heptylidene 3-chloroanilinomethylenemalonate in refluxing Dowtherm A following the procedure described in Example 11(B) yields a mixture of 5-chloro-4-hydroxyquinoline and 7-chloro-4-hydroxyquinoline.

EXAMPLE 17

6-chloro-4-hydroxy-2-methylquinoline.—A mixture containing 12.8 g. of 4-chloroaniline, 17.8 g. of ethyl orthoacetate and 14.4 g. of isopropylidene malonate was heated with stirring on a steam bath overnight, the ethanol formed by the reaction distilling off. The reaction mixture containing isopropylidene 4 - chloroanilinomethylmalonate [Formula I where Ar is 4-chlorophenyl, R is H, and $R_1=R_2=R_3=$methyl] was allowed to cool and then dissolved in 250 ml. of Dowtherm A. The solution was refluxed for five minutes and then allowed to cool to room temperature with stirring. The precipitate that separated was collected, washed with n-pentane and dried to yield 1.2 g. (62%) of 6-chloro-4-hydroxy-2-methylquinoline. A small amount of the product was recrystallized from dimethylformamide using decolorizing charcoal to yield the purified product, a yellow solid, M.P. 320–321° C. with decomposition.

*Analysis.*—Calcd. for $C_{10}H_8ClNO$ (percent): Cl, 18.31; N, 7.23. Found (percent): Cl, 18.17; N, 7.57.

Alternatively, 6-chloro-4-hydroxy-2-methylquinoline is obtained by directly heating the same quantities of 4-chloroaniline, ethyl orthoacetate and isopropylidene malonate in Dowtherm A as above, omitting the heating on the steam bath.

EXAMPLE 18

(A) Isopropylidene 3 - fluoroanilinomethylenemalonate.—A mixture containing 11.1 g. of 3-fluoroaniline, 14.8 g. of triethyl orthoformate and 15.8 g. of isopropylidene malonate was stirred and warmed on a steam bath for a few minutes whereupon a vigorous reaction ensued. The mixture set up to a cream-colored cake which was recrystallized from about 700 ml. of absolute ethanol to yield 24.9 g. (94%) of the white solid product, isopropylidene 3 - fluoroanilinomethylenemalonate, M.P. 159.0–160.0° C. (corr.), after drying in a vacuum oven at 60° C. overnight.

*Analysis.*—Calcd. for $C_{13}H_{12}FNO_4$ (percent): C, 58.87; H, 4.56; F, 7.16. Found (percent): C, 58.65; H, 4.54; F, 7.46.

(B) Heating a sample of isopropylidene 3-fluoroanilinomethylenemalonate in refluxing Dowtherm A following the procedure described in Exampe 11(B) yields a mixture of 5-fluoro-4-hydroxyquinoline and 7-fluoro-4-hydroxyquinoline.

EXAMPLE 19

(A) Isopropylidene 3-trifluoromethylanilinomethylenemalonate was prepared following the procedure described in Example 18(A) using 16.1 g. of 3-trifluoromethylaniline, 14.8 g. of triethyl orthoformate and 15.8 g. of isopropylidene malonate. There was thus obtained 28.3 g. (90%) of isopropylidene 3-trifluoromethylanilinomethylenemalonate, M.P. 155.2–156.2° C. (corr.), after one recrystallization from about 500 ml. of absolute ethanol using decolorizing charcoal.

Anaylsis.—Calcd. for $C_{14}H_{12}F_3NO_4$ (percent): C, 53.34; H, 3.84; F, 18.09. Found (percent): C, 53.09; H, 3.92; F, 17.80.

(B) Heating a sample of isopropylidene 3-trifluoromethylanilinomethylenemalonate in refluxing Dowtherm A following the procedure described in Example 11(B) yields a mixture of 4-hydroxy-5-trifluoromethylquinoline and 4-hydroxy-7-trifluoromethylquinoline.

EXAMPLE 20

(A) Isopropylidene 1-naphthylaminomethylenemalonate.—A mixture containing 14.3 g. of 1-naphthylamine, 14.8 g. of ethyl orthoformate, 15.8 g. of isopropylidene malonate and 1.0 g. of p-toluenesulfonic acid monohydrate was stirred at room temperature for about seven minutes, next heated on a steam bath for about ten minutes to distill off the ethanol formed by the reaction, and then cooled to room temperature with stirring. The solid that separated was collected and recrystallized from 95% ethanol to yield 23.8 g. (80%) of isopropylidene 1-naphthylaminomethylenemalonate. A 5.0 g. sample was recrystallized two additional times from ethanol to yield 4.3 g. of the product melting at 149.2–150.8° C. (corr.).

Analysis.—Calcd. for $C_{17}H_{15}NO_4$ (percent): N, 4.71. Found (percent): N, 4.66, 4.71.

(B) 4-hydroxybenzo(h)quinoline was prepared by cyclizing the product of Example 20(A) as follows: To 190 ml. of Dowtherm A heated to reflux was added in 3 to 4 g. portions with stirring 18.8 g. of isopropylidene 1-naphthylaminomethylenemalonate. After a vigorous reaction subsided, the reaction mixture was cooled to room temperature with stirring. The resulting precipitate was collected, washed well with n-pentane and air-dried to yield 10.2 g. (83%) of 4-hydroxybenzo(h)quinoline monohydrate. A small portion was recrystallized from ethanol to yield the purified product melting at 250–251° C.

Analysis.—Calcd. for $C_{13}H_9NO$ (percent): C, 79.98; H, 4.65; N, 7.17. Found (percent): C, 73.29; H, 5.63; N, 6.52, 6.56; $H_2O$, 8.37. Found (Dry Basis) (percent): C, 79.98; H, 5.12; N, 7.12, 7.16.

EXAMPLE 21

(A) Isopropylidene 4-sulfamylanilinomethylenemalonate.—To a warm mixture containing 17.2 g. of 4-aminobenzenesulfonamide, 15.8 g. of isopropylidene malonate, and 14.8 g. of triethyl orthoformate was added with stirring 0.5 g. of p-toluenesulfonic acid monohydrate, 200 ml. of isopropyl alcohol was added and the resulting mixture was heated with stirring on a steam bath for five minutes and then allowed to cool. The precipitate was collected and recrystallized from acetonitrile-dimethylacetamide (4:1), washed with ethanol and dried in a vacuum oven at 70° C. to yield 12.5 g. of isopropylidene 4-sulfamylanilinomethylenemalonate, M.P. 247.2–249.2° C. (corr.) with decomposition.

Analysis.—Calcd. for $C_{13}H_{14}N_2O_6S$ (percent): N, 8.60; S, 9.82. Found (percent): N, 8.68; S, 9.79.

(B) Heating a sample of isopropylidene 4-sulfamylanilinomethylenemalonate in Dowtherm A following the procedure described in Example 1(B) yields 4-hydroxy-6-sulfamylquinoline.

EXAMPLE 22

(A) Isopropylidene 3,5-dinitroanilinomethylenemalonate.—To a stirred mixture containing 9.3 g. of 3,5-dinitroaniline, 8.1 g. of isopropylidene malonate and 45 ml. of absolute ethanol was added 7.6 g. of triethyl orthoformate and the resulting mixture was heated on the steam bath with stirring for about fifteen minutes, allowing the ethanol to evaporate. The resulting yellow solid was recrystallized twice from acetonitrile and dried in a vacuum oven to yield 3.1 g. of pale yellow crystalline product, isopropylidene 3,5-dinitroanilinomethylenemalonate, M.P. 213.0–214.0° C. (corr.) with decomposition.

Analysis.—Calcd. for $C_{13}H_{11}N_3O_8$ (percent): C, 46.30; H, 3.29; N, 12.46. Found (percent): C, 46.49, 46.55; H, 3.75, 3.59; N, 12.34.

(B) 5,7-dinitro-4-hydroxyquinoline was prepared by cyclizing the product of Example 22(A) as follows: To 200 ml. of Dowtherm A heated to reflux (250° C.) was added with stirring 5.0 g. of isopropylidene 3,5-dinitroanilinomethylenemalonate over a period of thirty seconds. The reaction mixture was refluxed for an additional thirty seconds and was then allowed to cool to room temperature with stirring. The product that separated was collected, washed well with ether, triturated twice with boiling ethanol and dried in a vacuum oven to yield 1.2 g. (35%) of 5,7-dinitro-4-hydroxyquinoline, M.P. >360° C.

Analysis.—Calcd. for $C_9H_5N_3O_5$ (percent): C, 45.97; H, 2.14; N, 17.87. Found (percent): C, 46.16; H, 2.13; N, 17.24.

EXAMPLE 23

(A) 2,2'-dithiodi(4-chloro-ortho-phenylene)di(iminomethylidyne)bis[isopropylidene malonate].—To a stirred mixture containing 97.3 g. of 2-amino-4-chlorophenyl disulfide, 94.0 g. of isopropylidene malonate and 600 ml. of absolute ethanol was added 92.0 g. of triethyl orthoformate and the resulting mixture was heated on a steam bath with stirring. Within a few minutes the reaction mixture became a solid yellow cake which was heated for an additional forty minutes. The solid was boiled with 3.5 liters of acetonitrile, the undissolved solid was filtered off, and the filtrate was chilled in a cold room overnight. The undissolved solid was recrystallized from two liters of acetonitrile using decolorizing charcoal and air-dried to yield 27.6 g. of the product, M.P. 212–212.5° C. with decomposition. The precipitate which separated from the larger portion of acetonitrile was collected and air-dried to yield 101.4 g. of the product, M.P. 210–211° C. with decomposition. The two samples were then dried in a vacuum oven whereupon there was obtained 26.8 g. of the charcoaled sample, M.P. 215.0–217.0° C. (corr.) with decomposition and 98.7 g. of the uncharcoaled sample, M.P. 123° C. with decomposition A portion of the charcoaled sample was analyzed as follows:

Analysis.—Calcd. for $C_{26}H_{25}Cl_2N_2O_8S_2$ (percent): Cl, 11.34; S, 10.25. Mol. wt., 625.5. Found (percent): Cl, 11.31; S, 10.38. Mol. wt., 640±5%.

(B) 6-chloro-4-hydroxy-8-quinolyl disulfide was prepared by cyclizing the product of Example 23(A) as follows: To 63 ml. of Dowtherm A heated to reflux was added with stirring over a period of ninety seconds, 6.3 g. of 2,2'-dithiodi(4-chloro-ortho-phenylene)di-(iminomethylidyne)bis[isopropylidene malonate]. The reaction mixture was heated with stirring for an additional ninety seconds and then allowed to cool to room temperature with stirring. The solid that separated was collected to yield the product, 6-chloro-4-hydroxy-8-quinolyl disulfide.

The following compounds are obtained by following the two-step procedure described in Examples 1(A) and 1(B), using in the first step (like 1(A)) corresponding molar equivalent quantities of the appropriate aniline, ethyl orthoformate and isopropylidene malonate (use of p-toluenesulfonic acid monohydrate optional) and heating in the second step (like 1(B)) the resulting isopropylidene anilinomethylenemalonate in refluxing Dowtherm A to form the corresponding 4-hydroxyquinoline:

isopropylidene 4-biphenylaminomethylenemalonate (from 4-biphenylylamine) and 4-hydroxy-6-phenylquinoline;
isopropylidene 4-n-butoxyanilinomethylenemalonate (from 4-n-butoxyaniline) and 6-n-butoxy-4-hydroxyquinoline;
isopropylidene 4-ethylanilinomethylenemalonate (from 4-ethylaniline) and 6-ethyl-4-hydroxyquinoline;
isopropylidene 2,4-dimethylanilinomethylenemalonate (from 2,4-dimethylaniline) and 6,8-dimethyl-4-hydroxyquinoline;
isopropylidene 4-methylmercaptoanilinomethylenemalonate (from 4-methylmercaptoaniline) and 4-hydroxy-6-methylmercaptoquinoline;
isopropylidene 4-ethylsulfinylanilinomethylenemalonate (from 4-ethylsulfinylaniline) and 6-ethylsulfinyl-4-hydroxyquinoline;
isopropylidene 4-n-butylsulfonylanilinomethylenemalonate (from 4-n--butylsulfonylaniline) and 6-n-butylsulfonyl-4-hydroxyquinoline;
isopropylidene 4-iodoanilinomethylenemalonate (from 4-iodoaniline) and 4-hydroxy-6-iodoquinoline;
isopropylidene 4-n-butylaminoanilinomethylenemalonate (from 4-n-butylaminoaniline) and 6-n-butylamino-4-hydroxyquinoline;
isopropylidene 2-acetylaminoanilinomethylenemalonate (from 2-acetylaminoaniline) and 8-acetylamino-4-hydroxyquinoline;
isopropylidene 4-propionylaminoanilinomethylenemalonate (from 4-propionylaminoaniline) and 4-hydroxy-6-propionylaminoquinoline;
isopropylidene 4-benzyloxyanilinomethylenemalonate (from 4-benzyloxyaniline) and 6-benzyloxy-4-hydroxyquinoline;
isopropylidene 4-hydroxyanilinomethylenemalonate (from 4-hydroxyaniline) and 4,6-dihydroxyquinoline;
isopropylidene 2-benzylanilinomethylenemalonate (from 2-benzylaniline) and 8-benzyl-4-hydroxyquinoline;
isopropylidene 3-benzylanilinomethylenemalonate (from 3-benzylaniline) and a mixture of 5-benzyl-4-hydroxyquinoline and 7-benzyl-4-hydroxyquinoline;
isopropylidene 4-aminoanilinomethylenemalonate (from 4-aminoaniline) and 6-amino-4-hydroxyquinoline;
isopropylidene 2-aminoanilinomethylenemalonate (from 2-aminoaniline) and 8-amino-4-hydroxyquinoline;
isopropylidene 4-(unsubstituted-phenoxy)anilinomethylenemalonate [from 4-(unsubstituted-phenoxy)aniline] and 4-hydroxy-6-(unsubstituted-phenoxy)quinoline;
isopropylidene 3-(unsubstituted-phenoxy)anilinomethylenemalonate [from 3-(unsubstituted-phenoxy)aniline] and a mixture of 4-hydroxy-5-(unsubstituted-phenoxy)quinoline and 4-hydroxy-7-(unsubstituted-phenoxy)quinoline;
isopropylidene 4-(unsubstituted-phenylmercapto)-anilinomethylenemalonate [from 4-(unsubstituted-phenylmercapto)aniline] and 4-hydroxy-6-(unsubstituted-phenylmercapto)quinoline;
isopropylidene 4-anilinoanilinomethylenemalonate (from 4-anilinoaniline) and 6-anilino-4-hydroxyquinoline;
isopropylidene 3,5-xylidinomethylenemalonate, M.P. 170–172° C., (from 3,5-xylidine) and 5,7-dimethyl-4-hydroxyquinoline;
isopropylidene 2,5-xylidinomethylenemalonate, M.P. 162–163° C., (from 2,5-xylidine) and 5,8-dimethyl-4-hydroxyquinoline;
isopropylidene 3,4-xylidinomethylenemalonate, M.P. 135–137° C., (from 3,4-xylidine) and a mixture of 5,6-dimethyl-4-hydroxyquinoline and 6,7-dimethyl-4-hydroxyquinoline;
isopropylidene 2,3-xylidinomethylenemalonate, M.P. 138–139° C., (from 2,3-xylidine) and 7,8-dimethyl-4-hydroxyquinoline:
isopropylidene 2,4-xylidinomethylenemalonate, M.P. 146–147° C., (from 2,4-xylidine) and 6,8-dimethyl-4-hydroxyquinoline.

The following compounds are obtained by following the two-step procedure described in Examples 23(A) and 23(B), using in the first step (like 23(A)) corresponding molar equivalent quantities of the appropriate diamine, triethyl orthoformate and isopropylidene malonate and heating in the second step (like 23(B)) the resulting 2, 2' - disubstituted-di(iminomethylidyne)bis[isopropylidene malonate] in Dowtherm A to form the corresponding cyclized product:

2,5-dimethyl-1,4-phenylene-2,2'-di(iminomethylidyne) bis[isopropylidene malonate] (from 2,5-dimethyl-1,4-phenylenediamine) and 4,9-dihydroxy-5,10-dimethylpyrido[2,3-g]quinoline;
2,5-dichloro-1,4-phenylene-2,2'-di(iminomethylidyne) bis[isopropylidene malonate] (from 2,5-dichloro-1,4-phenylenediamine) and 5,10-dichloro-4,9-dihydroxypyrido[2,3-g]quinoline;
4,4'-diphenylylene-2,2'-di(iminomethylidyne)bis[isopropylidene malonate], M.P. 224–225° C. with decomposition (from 4,4'-biphenylylenediamine) and bis(4-hydroxy-6-quinolyl);
2,2'-methylene-di(para-phenylene)di(iminomethylidyne)bis[isopropylidene malonate] [from bis-(4-aminophenyl)-methane] and bis(4-hydroxy-6-quinolyl)methane;
2,2'-oxy-di(para-phenylene)-di(iminomethylidyne)bis [isopropylidene malonate] (from 4-aminophenyl ether) and 4-hydroxy-6-quinolyl ether;
2,2'-thiodi(para-phenylene)di(iminomethylidyne)bis [isopropylidene malonate] (from 4-aminophenyl sulfide) and 4-hydroxy-6-quinolyl sulfide;
2,2'-iminodi(para-phenylene)di(iminomethylidyne)bis [isopropylidene malonate] [from N,N-bis(4-aminophenyl)-amine] and N,N-bis(4-hydroxy-6-quinolyl)amine;
2,2'-methyliminodi(para-phenylene)di(iminomethylidyne)bis[isopropylidene malonate] [from N,N-bis(4-aminophenyl)-methylamine] and N,N-bis (4-hydroxy-6-quinolyl)methylamine;
2,2'-carbonyldi(para-phenylene)di(iminomethylidyne) bis[isopropylidene malonate] [from bis(4-aminophenyl)ketone] and bis-(4-hydroxy-6-quinolyl) ketone.

Following the procedure described in Example 23(A) using a molar equivalent quantity of 2,6-diamino-pyridine in place of 2-amino-4-chlorophenyl disulfide, there was obtained diisopropylidene 2,6 - pyridinediyl-bis(aminomethylenemalonate), M.P. 261–262° C. with decomposition.

Following the two-step procedure described in Exampes 20(A) and 20(B) using a molar equivalent quantity of the appropriate naphthylamine in place of 1-naphthylamine in the first step, the following compounds are prepared:

isopropylidene 4-ethoxy-1-naphthylaminomethylenemalonate (using 4-ethoxy-1-naphthylamine) and 6-ethoxy-4-hydroxybenzo(h)quinoline;
isopropylidene 3,4-dimethyl-1-naphthylaminomethylenemalonate (using 3,4-dimethyl-1-naphthylamine) and 5,6-dimethyl-4-hydroxybenzo(h)quinoline;
isopropylidene 4-benzyl-1-naphthylaminomethylenemalonate (using 4-benzyl-1-naphthylamine) and 6-benzyl-4-hydroxybenzo(h)quinoline;

isopropylidene 2-naphthylaminomethylenemalonate using 2-naphthylamine) and 1-hydroxybenzo(f)quinoline; and, isopropylidene 4-chloro-3-methoxy-2-naphthylaminomethylenemalonate (using 4-chloro-3-methoxy-2-naphthylamine) and 6-chloro-1-hydroxy-5-methoxybenzo(f)quinoline.

In addition to having utility as intermediates, compounds of Formula I also have been found to have antiviral activity when tested by standard procedures; for example, when administered orally or subcutaneously at respective dose levels of up to 400 or 200 mg./kg./day to mice infected with vaccinia virus, they were found to increase survival time over untreated controls and to cure up to about 80% of the mice tested.

The actual determination of the numerical biological data definitive for a particular compound is readily obtained by standard test procedures, referred to above, by technicians versed in pharmacological test procedures, without any need for any extensive experimentation.

I claim:

1. The process which consists of heating in an inert solvent at about 200–300° C. a compound of the formula

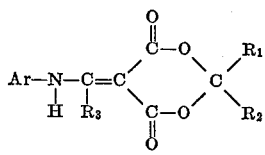

where $R_1$ and $R_2$ are each lower-alkyl, $R_3$ is hydrogen or methyl, and Ar is aryl selected from the group consisting of phenyl, naphthyl, phenyl having from one to two substituents selected from lower-alkyl, lower-alkoxy and halo, phenyl having a single substituent selected from trihalomethyl, lower-alkylamino, lower-alkanoylamino, nitro, hydroxy, phenoxy and anilino, and naphthyl having a single substituent selected from halo and lower-alkoxy, said aryl having a substitutable ring-carbon atom ortho to its ring-carbon connected to the nitrogen atom of the aminomethylenemalonate moiety, to form (4-hydroxy-2-$R_3$-5,6-pyrido)-Ar, where lower-alkyl in each instance is non-tertiary and has from one to six carbon atoms.

2. The process according to claim 1 which consists of heating isopropylidene anilinomethylenemalonate to form 4-hydroxyquinoline where anilino is unsubstituted or substituted as indicated in claim 1 for phenyl.

3. The process according to claim 1 which consists of heating isopropylidene naphthylaminomethylenemalonate to form benzo-4-hydroxyquinoline where naphthyl is unsubstituted or substituted as indicated in claim 1 for naphthyl.

4. The process according to claim 3 which consists of heating isopropylidene anilinomethylenemalonate to form 4-hydroxyquinoline.

References Cited

UNITED STATES PATENTS

| | | | |
|---|---|---|---|
| 3,178,348 | 4/1965 | Bickerson | 260—289 |
| 3,563,981 | 2/1971 | Lesher | 260—283 SY |
| 2,504,896 | 4/1950 | Snyder | 260—289 R |
| 2,614,121 | 10/1952 | Price | 260—287 R |
| 3,313,818 | 4/1967 | Lesher | 260—289 R |

DONALD G. DAUS, Primary Examiner

U.S. Cl. X.R.

260—283 SY, 287 R, 288 R

UNITED STATES PATENT OFFICE
CERTIFICATE OF CORRECTION

Patent No. 3,798,227　　　　　　Dated March 19, 1974

Inventor(s) George Y. Lesher

It is certified that error appears in the above-identified patent and that said Letters Patent are hereby corrected as shown below:

Column 1, line 64, "loweralkyl" should read -- lower-alkyl --.

Column 3, lines 17-23, the formula designated as V should read as follows:

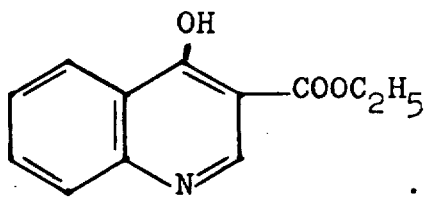

Column 5, line 46, "benzo[f][1,7]" should read -- benzo[f][1,7] --.

Column 6, line 12, "designated" should read -- designate --.

Column 6, line 30, "carrageenin induced" should read -- carrageenin-induced --.

Signed and sealed this 18th day of March 1975.

(SEAL)
Attest:

RUTH C. MASON
Attesting Officer

C. MARSHALL DANN
Commissioner of Patents
and Trademarks